(12) United States Patent
Yamane et al.

(10) Patent No.: US 11,719,733 B2
(45) Date of Patent: Aug. 8, 2023

(54) STORAGE MEDIUM, EMI CALCULATION METHOD, AND EMI CALCULATION APPARATUS

(71) Applicant: FUJITSU LIMITED, Kawasaki (JP)

(72) Inventors: Shohei Yamane, Kawasaki (JP); Yoichi Kochibe, Mihama (JP); Hiroaki Yamada, Kawasaki (JP); Takashi Yamazaki, Kawasaki (JP); Takashi Kobayashi, Machida (JP); Masatoshi Ogawa, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/676,828

(22) Filed: Feb. 22, 2022

(65) Prior Publication Data

US 2022/0341979 A1 Oct. 27, 2022

(30) Foreign Application Priority Data

Apr. 22, 2021 (JP) .................................. 2021-072550

(51) Int. Cl.
*G01R 31/00* (2006.01)
*G01R 29/08* (2006.01)
(Continued)

(52) U.S. Cl.
CPC .......... *G01R 29/0871* (2013.01); *G01R 1/18* (2013.01); *G01R 29/0814* (2013.01);
(Continued)

(58) Field of Classification Search
CPC .......... G01R 29/0871; G01R 29/0814; G01R 31/002; G01R 1/18; G01R 31/2886;
(Continued)

(56) References Cited

U.S. PATENT DOCUMENTS

2002/0019713 A1 2/2002 Nagase et al.
2006/0139032 A1* 6/2006 Kalokitis ........... G01R 29/0814
324/457
(Continued)

FOREIGN PATENT DOCUMENTS

JP 2002-90403 A 3/2002
JP 2020-60877 A 4/2020

OTHER PUBLICATIONS

Extended European Search dated Aug. 3, 2022, in European Application No. 22156094.9.
(Continued)

*Primary Examiner* — Raul J Rios Russo
(74) *Attorney, Agent, or Firm* — Xsensus LLP

(57) ABSTRACT

A non-transitory computer-readable storage medium storing a n EMI calculation program that causes at least one computer to execute a process, the process includes inputting circuit information of a first circuit to a machine learning model; acquiring an EMI value at a certain frequency of the first circuit; selecting, based on an impedance characteristic of the first circuit and the EMI value at the certain frequency, first EMI information from a plurality of pieces of EMI information in each of which an impedance characteristic of each of a plurality of circuits is associated with EMI values at a plurality of frequencies of each of the plurality of circuits; and acquiring an EMI value at another frequency different from the certain frequency of the first circuit based on the EMI value at the certain frequency and the first EMI information.

12 Claims, 11 Drawing Sheets

(51) Int. Cl.
*G01R 1/18* (2006.01)
*G01R 31/28* (2006.01)
*H01L 21/687* (2006.01)
*H01L 21/67* (2006.01)

(52) U.S. Cl.
CPC ....... *G01R 31/002* (2013.01); *G01R 31/2886* (2013.01); *G01R 31/2889* (2013.01); *H01L 21/67109* (2013.01); *H01L 21/68714* (2013.01); *H01L 21/68785* (2013.01)

(58) Field of Classification Search
CPC . G01R 31/2889; G06F 2119/10; G06F 30/33; G06F 30/398; G06F 30/27; H01L 21/68785; H01L 21/68714; H01L 21/67109
USPC ......... 324/71, 378, 403, 415, 425, 500, 537, 324/750.26, 750.27
See application file for complete search history.

(56) References Cited

U.S. PATENT DOCUMENTS

| | | | |
|---|---|---|---|
| 2015/0241493 A1* | 8/2015 | Canne ................ | G01R 29/0814 324/612 |
| 2018/0321293 A1* | 11/2018 | Aseltine ............ | G01R 29/0871 |
| 2020/0110850 A1 | 4/2020 | Yamane et al. | |
| 2022/0163580 A1* | 5/2022 | Byrd ................. | G01R 1/06722 |

OTHER PUBLICATIONS

Mostefaoui-Kasri Kahina et al: "Calculation of conducted EMI generated by single-ended primary inductance converter", International Review of Electrical Engineering, May 1, 2012 (May 1, 2012), pp. 4469-4479, XP055945648.

Boubin Matthew et al: "EMI Diagnostics of Three Phase Inverters Using Machine Learning Algorithins", 2018 IEEE Energy Conversion Congress and Exposition (ECCE), IEEE, Sep. 23, 2018 (Sep. 23, 2018), pp. 4062-4069, XP033463472.

* cited by examiner

FIG. 4

| CIRCUIT IDENTIFICATION INFORMATION | IMPEDANCE CHARACTERISTIC | EMI INFORMATION |
|---|---|---|
| C101 | IMPEDANCE CHARACTERISTIC OF ANALYZED CIRCUIT WITH CIRCUIT IDENTIFICATION INFORMATION "C101" | EMI INFORMATION OF ANALYZED CIRCUIT WITH CIRCUIT IDENTIFICATION INFORMATION "C101" |
| C102 | IMPEDANCE CHARACTERISTIC OF ANALYZED CIRCUIT WITH CIRCUIT IDENTIFICATION INFORMATION "C102" | EMI INFORMATION OF ANALYZED CIRCUIT WITH CIRCUIT IDENTIFICATION INFORMATION "C102" |
| C103 | IMPEDANCE CHARACTERISTIC OF ANALYZED CIRCUIT WITH CIRCUIT IDENTIFICATION INFORMATION "C103" | EMI INFORMATION OF ANALYZED CIRCUIT WITH CIRCUIT IDENTIFICATION INFORMATION "C103" |
| ... | ... | ... |

142

STORAGE MEDIUM, EMI CALCULATION METHOD, AND EMI CALCULATION APPARATUS

CROSS-REFERENCE TO RELATED APPLICATION

This application is based upon and claims the benefit of priority of the prior Japanese Patent Application No. 2021-072550, filed on Apr. 22, 2021, the entire contents of which are incorporated herein by reference.

FIELD

The embodiment discussed herein is related to a storage medium, an EMI calculation method, and an EMI calculation apparatus.

BACKGROUND

An electromagnetic wave is radiated by causing a current to flow through an electronic circuit board (hereafter, referred to as a circuit). A situation in which such electromagnetic wave adversely affects an electronic device or the like as noise is referred to as an electro magnetic interference (EMI). Hereinafter, an intensity of the electromagnetic wave radiated when a current flows through a circuit is referred to as an "EMI value" as appropriate.

A regulation value is provided for each frequency, and in a case where a circuit is designed, it is desired to design such that an EMI value for each frequency is within the regulation value. For this reason, the EMI value is predicted from circuit information by simulation or deep learning technique.

Although it is possible to predict an EMI value with high accuracy when the EMI value is predicted by using a simulation, in some cases, a deep learning technique is used instead of the simulation due to high cost. Hereinafter, Related Art 1 will be described as an example of the related art for predicting an EMI value.

Related Art 1 will be described. FIG. 9 is a diagram for describing Related Art 1. In Related Art 1, a simulation is executed by using some pieces of circuit information 10 to calculate an EMI value, and the calculated EMI value is used as correct answer data 11. In Related Art 1, a set of the circuit information 10 and the correct answer data 11 is set as training data, and training of a machine learning model 12 is executed. The machine learning model 12 corresponds to artificial intelligence (AI) or the like. In Related Art 1, the EMI value corresponding to circuit information 13 is calculated by inputting practical circuit information 13 to the machine learning model 12.

Japanese Laid-open Patent Publication Nos. 2002-90403 (Related Art 1) and 2020-60877 are disclosed as related art.

SUMMARY

According to an aspect of the embodiments, a non-transitory computer-readable storage medium storing an EMI calculation program that causes at least one computer to execute a process, the process includes inputting circuit information of a first circuit to a machine learning model; acquiring an EMI value at a certain frequency of the first circuit; selecting, based on an impedance characteristic of the first circuit and the EMI value at the certain frequency, first EMI information from a plurality of pieces of EMI information in each of which an impedance characteristic of each of a plurality of circuits is associated with EMI values at a plurality of frequencies of each of the plurality of circuits; and acquiring an EMI value at another frequency different from the certain frequency of the first circuit based on the EMI value at the certain frequency and the first EMI information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a data structure of an EMI information table;

DESCRIPTION OF EMBODIMENTS

However, in the related art described above, in a case where a machine learning model for predicting an EMI value at each frequency is to be generated, there is a problem that a load of machine learning processing increases.

Figure 10:
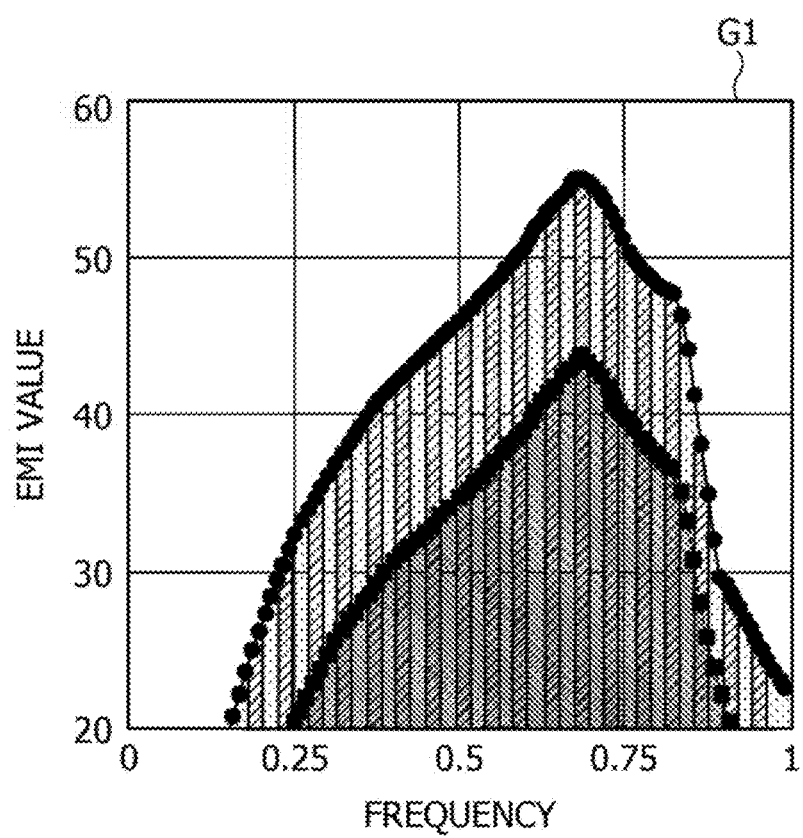
FIG. 10 is a diagram (1) for describing a problem of the related art.
Figure 11:
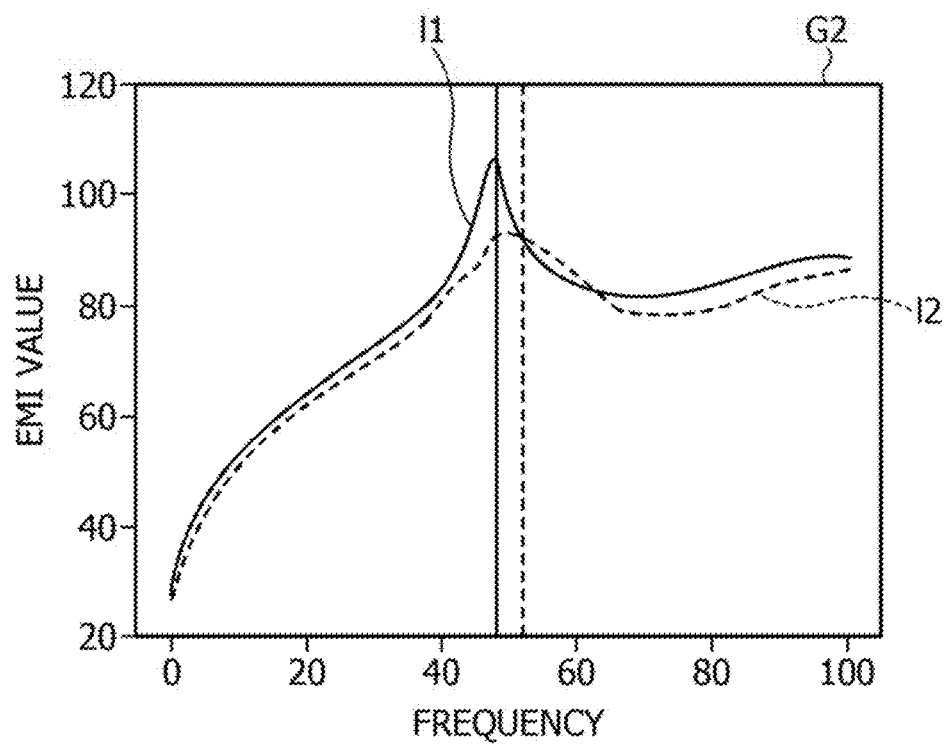
FIG. 11 is a diagram (2) for describing a problem of the related art.

FIGS. 10 and 11 are diagrams for describing a problem of the related art. FIG. 10 is described. A horizontal axis of a graph G1 illustrated in FIG. 10 is an axis corresponding to frequencies, and a vertical axis is an axis corresponding to EMI values. In the graph G1, EMI values are output in increments of 9.7 MHz from 30 MHz to 1 GHz. As described above, in a case where the EMI values are output in increments of 9.7 MHz, when the related art is applied as it is, a 101-dimensional regression is performed, and the load of the machine learning processing increases.

FIG. 11 is described. A horizontal axis of a graph G2 illustrated in FIG. 11 is an axis corresponding to frequencies, and a vertical axis is an axis corresponding to EMI values. A line l1 indicates EMI values for each frequency used when training the machine learning model. A line l2 indicates EMI values for each frequency output by the trained machine learning model. A peak of an EMI value is often steep, and in a case where a 101-dimensional average error or the like is used as a loss function, training is performed so as to reduce an error of another portion rather than increase an error in an attempt to hit the peak, so that the peak is shifted. Also in the graph G2, a peak of the line l1 and a peak of the line l2 are shifted from each other.

According to one aspect, an object of the present disclosure is to provide an EMI calculation program, an EMI calculation method, and an EMI calculation apparatus capable of reducing a load of machine learning processing and generating a machine learning model that accurately predicts an EMI value at each frequency.

A load of machine learning processing may be reduced, and a machine learning model that accurately predicts an EMI value at each frequency may be generated.

Hereinafter, an embodiment of an EMI calculation program, an EMI calculation method, and an EMI calculation apparatus disclosed in the present application will be described in detail with reference to the drawings. This disclosure is not limited by the embodiment.

Embodiment

Figure 1:
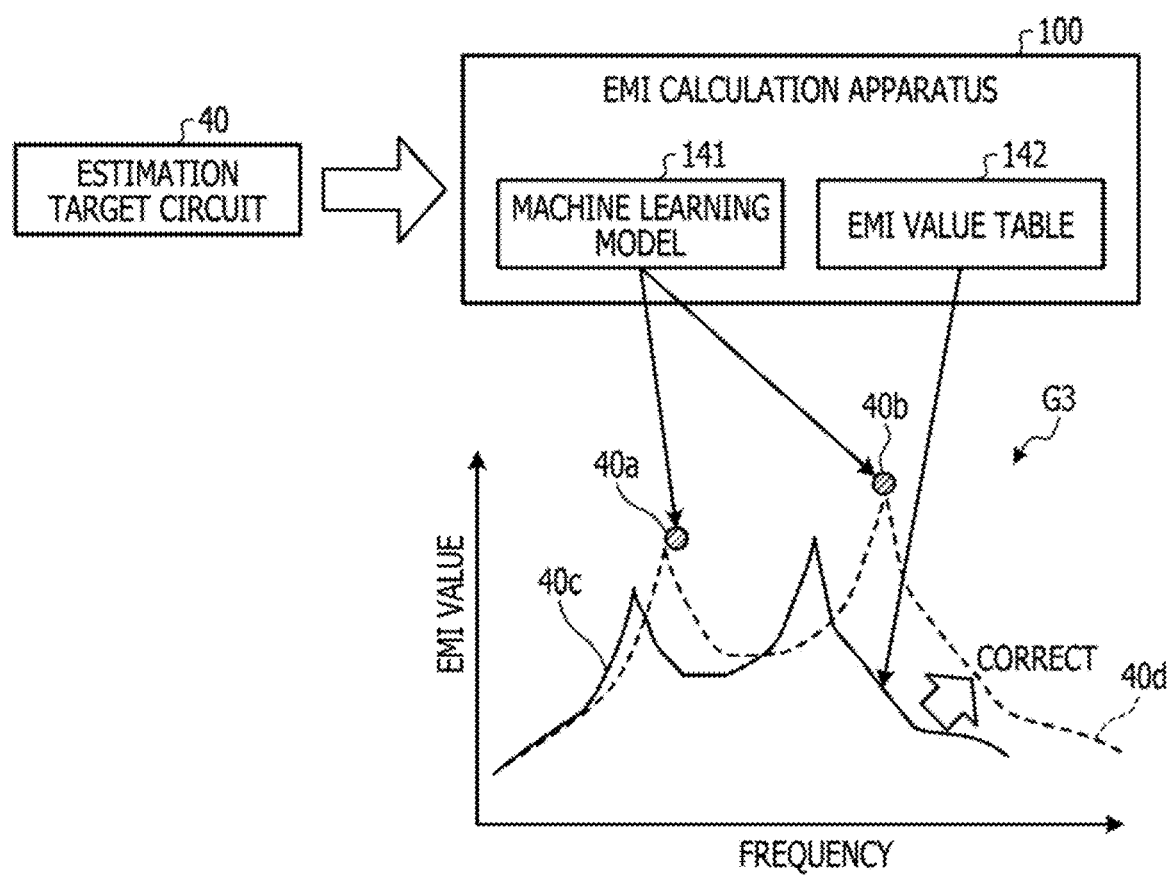
FIG. 1 is a diagram for describing processing of an EMI calculation apparatus according to a present embodiment.

An example of processing of an EMI calculation apparatus according to the present embodiment will be described. FIG. 1 is a diagram for describing the processing of the EMI calculation apparatus according to the present embodiment. A horizontal axis of a graph G3 illustrated in FIG. 1 is an axis corresponding to frequencies, and a vertical axis is an axis corresponding to EMI values.

In the EMI calculation apparatus 100, when a resonance frequency is input, a machine learning model 141 that outputs an EMI value corresponding to the input resonance frequency is trained in advance and used. The EMI calculation apparatus holds an EMI information table 142 in which a relationship between a circuit having a known EMI value at each frequency and a frequency characteristic of an impedance of the circuit is defined.

Hereinafter, the frequency characteristic of the impedance is referred to as an "impedance characteristic" as appropriate. An EMI value at each frequency is collectively referred to as "EMI information". A circuit of which an EMI value at each frequency and an impedance characteristic are known is referred to as an "analyzed circuit". A circuit that is an estimation target of an EMI value is referred to as an "estimation target circuit".

After receiving input of an estimation target circuit 40, the EMI calculation apparatus 100 inputs resonance frequencies of the estimation target circuit 40 to the machine learning model 141 to specify EMI values 40a and 40b corresponding to the resonance frequencies of the estimation target circuit 40.

The EMI calculation apparatus 100 specifies an analyzed circuit having an impedance characteristic similar to an impedance characteristic of the estimation target circuit 40, and acquires EMI information 40b of the specified analyzed circuit.

The EMI calculation apparatus 100 generates EMI information 40d by correcting a shape of the entire EMI information 40b such that peak values of the EMI information 40b matches the EMI values 40a and 40b corresponding to the resonance frequencies. The EMI calculation apparatus 100 outputs the EMI information 40d as the EMI value at each frequency of the estimation target circuit 40.

As described above, according to the EMI calculation apparatus 100 according to the present embodiment, the EMI value of the resonance frequency of the estimation target circuit is specified by using the machine learning model 141. The EMI calculation apparatus 100 calculates EMI values at remaining frequencies other than the resonance frequency by using the EMI value at each frequency of the analyzed circuit having a characteristic similar to the impedance characteristic of the estimation target circuit. Since the machine learning model 141 is trained by a relationship between the resonance frequency and the EMI value, it is possible to reduce the load expected for machine learning of the machine learning model as compared with a case where the machine learning is executed by using the EMI value at each frequency respectively.

In a case where the EMI values of the remaining frequencies are interpolated based on the EMI value of the resonance frequency, a method of simply extracting EMI information in which the EMI values of the resonance frequencies are close to each other, from the EMI values at each of the frequencies of the analyzed circuit is conceivable. However, even in a case where the EMI values at the resonance frequencies are close to each other, the other frequencies may not coincide with each other.

Figure 2:
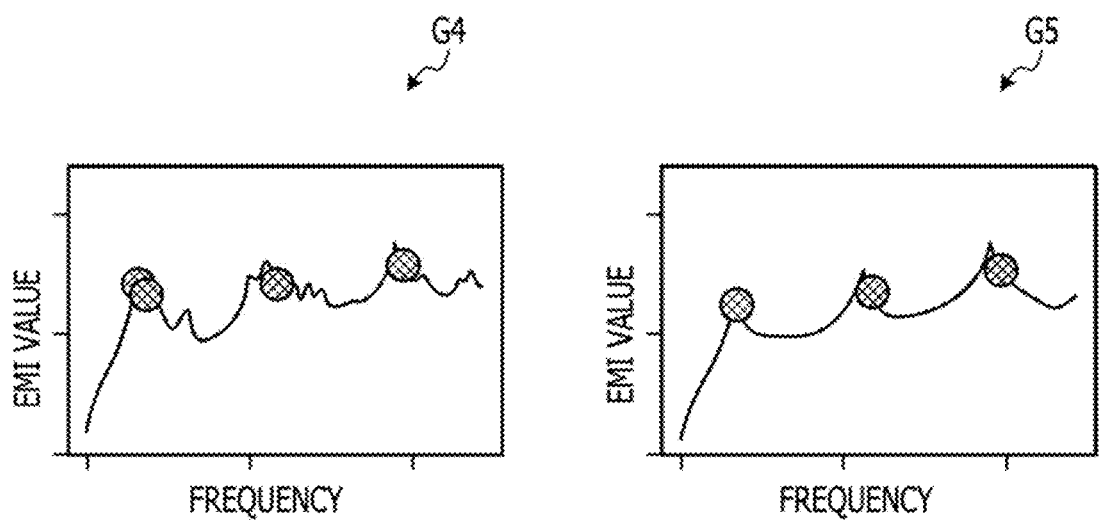
FIG. 2 is a diagram illustrating an example in which, although EMI values at resonance frequencies are close to each other, EMI values at other frequencies are different from each other.

FIG. 2 is a diagram illustrating an example in which, although EMI values at resonance frequencies are close to each other, EMI values at other frequencies are different from each other. A horizontal axis of graphs G4 and G5 illustrated in FIG. 2 is an axis corresponding to frequencies, and a vertical axis is an axis corresponding to EMI values. As for the respective EMI information in the graph G4 and EMI information in the graph G5, different EMI values at different frequencies of the analyzed circuit are used. Comparing the graph G4 with the graph G5, the EMI values at the resonance frequencies of the graph G4 are similar to the EMI values at the resonance frequencies of the graph G5, but the EMI values at the other frequencies are not coincident with each other.

For example, in a case where the EMI values of the remaining frequencies are interpolated based on the EMI value of the resonance frequency, the EMI value at each frequency of the estimation target circuit may not be calculated with high accuracy by the method of extracting the EMI information in which the EMI values of the resonance frequencies are close to each other, from the EMI information of the analyzed circuit.

On the other hand, as described with reference to FIG. 1, the EMI calculation apparatus 100 according to the present embodiment performs calculation by correcting the EMI information of the analyzed circuit having a characteristic similar to the impedance characteristic of the estimation target circuit based on the EMI values of the remaining frequencies other than the resonance frequency. Accordingly, it is possible to calculate the EMI values at all frequencies without impairing the accuracy of estimating the EMI value.

Since the impedance affects current intensity and the current intensity affects the electromagnetic noise intensity, it is possible to approximate fine fluctuations of the EMI values other than the resonance frequency by using the EMI information of the analyzed circuit close to the impedance characteristic.

Figure 3:
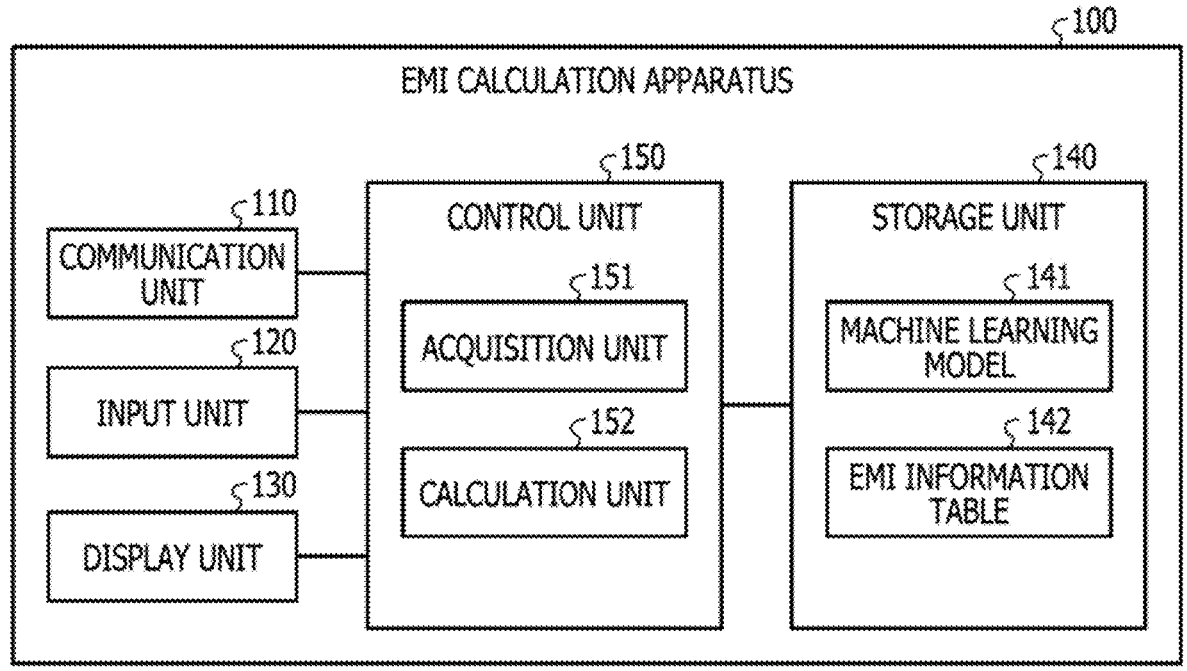
FIG. 3 is a functional block diagram illustrating a configuration of an EMI calculation apparatus according to the present embodiment.

Next, an example of a configuration of the EMI calculation apparatus 100 according to the present embodiment will be described. FIG. 3 is a functional block diagram illustrating the configuration of the EMI calculation apparatus according to the present embodiment. As illustrated in FIG. 3, the EMI calculation apparatus 100 includes a communication unit 110, an input unit 120, a display unit 130, a storage unit 140, and a control unit 150.

The communication unit 110 performs data communication with an external apparatus (not illustrated) via a network. For example, the communication unit 110 receives information on the estimation target circuit or the like from the external apparatus.

The input unit 120 receives various kinds of data from a user or the like and inputs the various kinds of data to the EMI calculation apparatus 100.

The display unit 130 displays information output from the control unit 150. For example, the display unit 130 displays EMI information or the like of the estimation target circuit output from the control unit 150.

The storage unit 140 stores data, a program to be executed by the control unit 150, and the like. The storage unit 140 stores the machine learning model 141 and the EMI information table 142.

It is assumed that the machine learning model 141 has been trained in advance by training data. The machine learning model 141 is an example of a neural network. For example, the machine learning model 141 is trained based on a back propagation method or the like.

The training data used in a case of training the machine learning model 141 associates an input "resonance frequency of a circuit" with an output (correct answer data) "EMI value corresponding to the resonance frequency of the circuit". By inputting the resonance frequency to the trained machine learning model 141, an EMI value corresponding to the resonance frequency is output.

For a plurality of analyzed circuits, the EMI information table 142 holds impedance characteristics of the analyzed circuits and EMI information in association with each other. FIG. 4 is a diagram illustrating an example of a data structure of the EMI information table. As illustrated in FIG. 4, in the EMI information table 142, circuit identification information, the impedance characteristic, and the EMI information are associated with each other. The circuit identification information is information for uniquely identifying the analyzed circuit.

Figure 5:
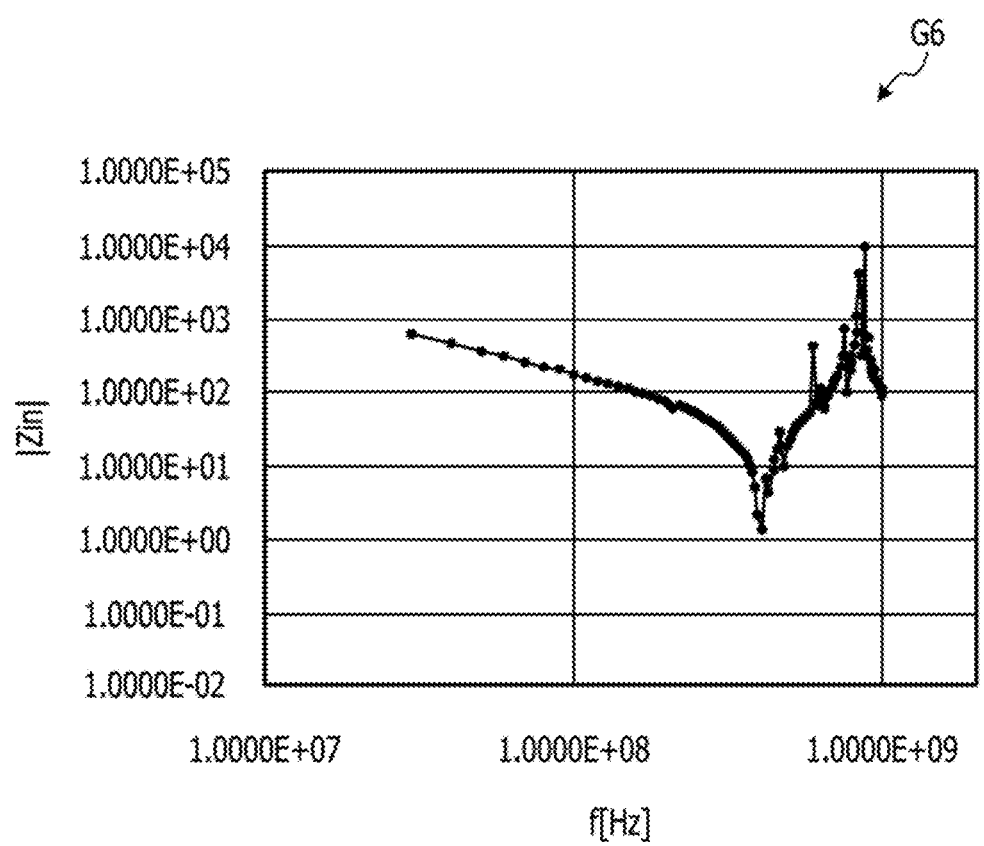
FIG. 5 is a diagram illustrating an example of an impedance characteristic.

The impedance characteristic indicates a frequency characteristic of the impedance of the analyzed circuit. FIG. 5 is a diagram illustrating an example of the impedance characteristic. A horizontal axis of a graph G6 in FIG. 5 is an axis corresponding to frequencies, and a vertical axis is an axis corresponding to absolute values of impedance Zin. As illustrated in FIG. 5, in the impedance characteristic, an impedance value is associated with each frequency.

Figure 6:
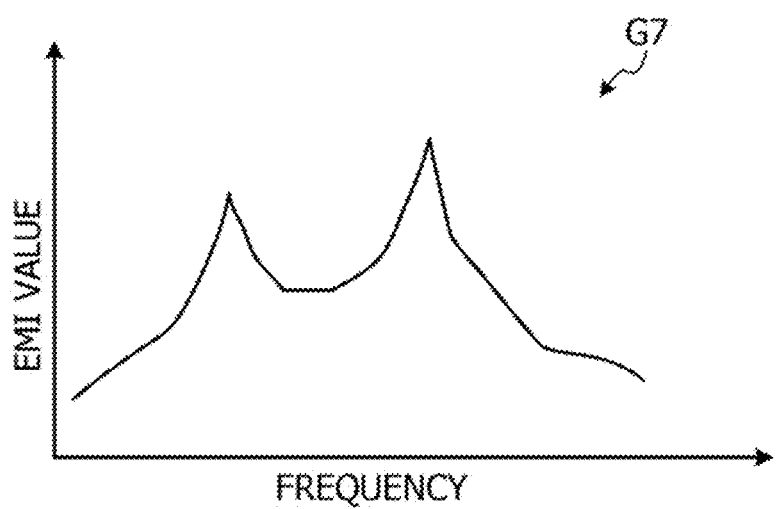
FIG. 6 is a diagram illustrating an example of EMI information.

The EMI information indicates an EMI value at each frequency of the analyzed circuit. FIG. 6 is a diagram illustrating an example of the EMI information. A horizontal axis of a graph G7 in FIG. 6 is an axis corresponding to frequencies, and a vertical axis is an axis corresponding to EMI values. As illustrated in FIG. 6, in the EMI information, EMI values corresponding to frequencies are associated for each frequency.

The description returns to FIG. 3. The control unit 150 includes an acquisition unit 151 and a calculation unit 152.

The acquisition unit 151 acquires information on the estimation target circuit via the communication unit 110 or the input unit 120. The acquisition unit 151 generates equivalent circuit information equivalent to the estimation target circuit based on the information on the estimation target circuit. The equivalent circuit information is information obtained by simplifying elements of the estimation target circuit to minimum elements representing the characteristic of the estimation target circuit.

The acquisition unit 151 inputs the equivalent circuit information to a circuit simulator and acquires a resonance frequency and an impedance characteristic of the estimation target circuit (equivalent circuit information). For example, the acquisition unit 151 uses simulation program with integrated circuit emphasis (SPICE) or the like as the circuit simulator.

Subsequently, the acquisition unit 151 inputs the resonance frequency of the estimation target circuit to the trained machine learning model 141 to acquire an EMI value corresponding to the resonance frequency of the estimation target circuit.

The acquisition unit 151 outputs the EMI value at the resonance frequency of the estimation target circuit acquired by the above-described processing and the impedance characteristic of the estimation target circuit to the calculation unit 152.

By comparing the impedance characteristic of the estimation target circuit with the impedance characteristic of each analyzed circuit registered in the EMI information table 142, the calculation unit 152 specifies an impedance characteristic most similar to the impedance characteristic of the estimation target circuit. Hereinafter, the analyzed circuit having the impedance characteristic most similar to the impedance characteristic of the estimation target circuit is referred to as a "similar circuit".

For example, the calculation unit 152 calculates each of absolute values of differences between the impedances at the respective frequencies in the impedance characteristic to be compared, and determines that the compared impedance characteristic is more similar, as the total value of the absolute values is smaller.

From the plurality of pieces of EMI information included in the EMI information table 142, the calculation unit 152 selects EMI information of the similar circuit and acquires the selected EMI information.

Subsequently, based on the EMI value at the resonance frequency of the estimation target circuit and the EMI information of the similar circuit, the calculation unit 152 calculates EMI values at other frequencies different from the resonance frequency of the estimation target circuit.

Processing of the calculation unit 152 will be described with reference to the above-described FIG. 1. EMI values of the resonance frequencies of the estimation target circuit are referred to as the EMI values 40a and 40b, and the EMI information of the similar circuit is referred to as EMI information 40c. The calculation unit 152 generates EMI information 40d by correcting a shape of the entire EMI information 40b such that peak values of the EMI information 40b match the EMI values 40a and 40b corresponding to the resonance frequencies. The EMI calculation apparatus 100 calculates the EMI information 40d as the EMI value at each frequency of the estimation target circuit.

In a case of correcting the shape of the entire EMI information 40c, the calculation unit 152 deforms the peak values of the EMI information 40b in a frequency direction and a direction of the EMI values so that the peak values match the EMI values 40a and 40b. The calculation unit 152 may output and display the EMI information 40b of the estimation target circuit on the display unit 130 or may output the EMI information 40b of the estimation target circuit to an external apparatus via the communication unit 110.

Figure 7:
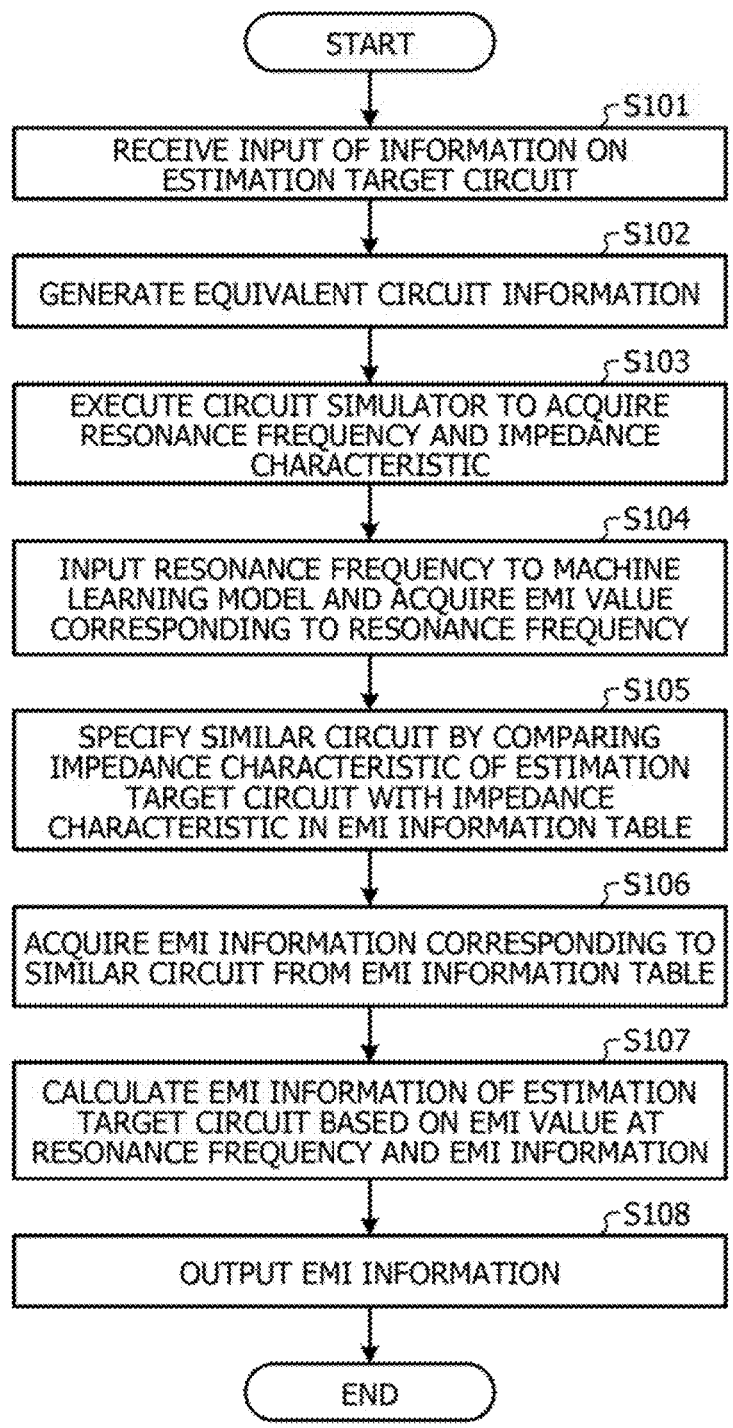
FIG. 7 is a flowchart illustrating a processing procedure of an EMI calculation apparatus according to the present embodiment.

Next, an example of a processing procedure of the EMI calculation apparatus 100 according to the present embodiment will be described. FIG. 7 is a flowchart illustrating the processing procedure of the EMI calculation apparatus according to the present embodiment. As illustrated in FIG.

7, the acquisition unit 151 of the EMI calculation apparatus 100 receives input of information on the estimation target circuit (step S101).

The acquisition unit 151 generates equivalent circuit information of the estimation target circuit (step S102). The acquisition unit 151 executes the circuit simulator and acquires a resonance frequency and an impedance characteristic of the estimation target circuit (equivalent circuit information) (step S103).

The acquisition unit 151 inputs the resonance frequency to the machine learning model 141 and acquires an EMI value corresponding to the resonance frequency (step S104). By comparing the impedance characteristic of the estimation target circuit with the impedance characteristic in the EMI information table 142, the EMI calculation apparatus 100 specifies a similar circuit (step S105).

From the EMI information table 142, the calculation unit 152 acquires EMI information corresponding to the similar circuit (step S106). Based on the EMI value at the resonance frequency of the estimation target circuit and the acquired EMI information, the calculation unit 152 calculates EMI information of the estimation target circuit (step S107). The calculation unit 152 outputs the EMI information of the estimation target circuit (step S108).

Next, effects of the EMI calculation apparatus 100 according to the present embodiment will be described. The EMI calculation apparatus 100 specifies the EMI value at the resonance frequency of the estimation target circuit by using the machine learning model 141. The EMI calculation apparatus 100 calculates the EMI values at the remaining frequencies other than the resonance frequency by using the EMI information of the similar circuit having a characteristic similar to the impedance characteristic of the estimation target circuit. Since the machine learning model 141 is trained by a relationship between the resonance frequency and the EMI value, it is possible to reduce the load expected for the machine learning of the machine learning model as compared with a case where the machine learning is executed by using the EMI values of all the frequencies respectively.

The EMI calculation apparatus 100 corrects the shape of the entire EMI information such that the peak value of the EMI information of the similar circuit matches the EMI value corresponding to the resonance frequency of the analyzed circuit. Accordingly, it is possible to calculate the EMI values at all frequencies without impairing the accuracy of estimating the EMI value.

The EMI calculation apparatus 100 generates equivalent circuit information from information on the estimation target circuit, acquires a resonance frequency by inputting the equivalent circuit information to the circuit simulator, and specifies an EMI value by inputting the acquired resonance frequency to the machine learning model 141. Accordingly, it is possible to efficiently acquire the EMI value corresponding to the resonance frequency of the estimation target circuit.

By the way, the processing of the EMI calculation apparatus 100 described above is an example, and the EMI calculation apparatus 100 may execute other processing. For example, the EMI calculation apparatus 100 trains the machine learning model 141 by using the training data, and obtains the EMI value corresponding to the resonance frequency by using the trained machine learning model 141.

In a case where the machine learning model 141 is trained, the EMI calculation apparatus 100 may perform training by using training data in which the input "resonance frequency of circuit" and "image of current distribution of circuit" are associated with the output "EMI value corresponding to resonance frequency of circuit". In this case, the acquisition unit 151 acquires images of the resonance frequency and the current distribution of the estimation target circuit (equivalent circuit information) by using the circuit simulator, inputs the acquired images of the resonance frequency and the current distribution to the machine learning model 141, and calculates the EMI value corresponding to the resonance frequency.

Figure 8:
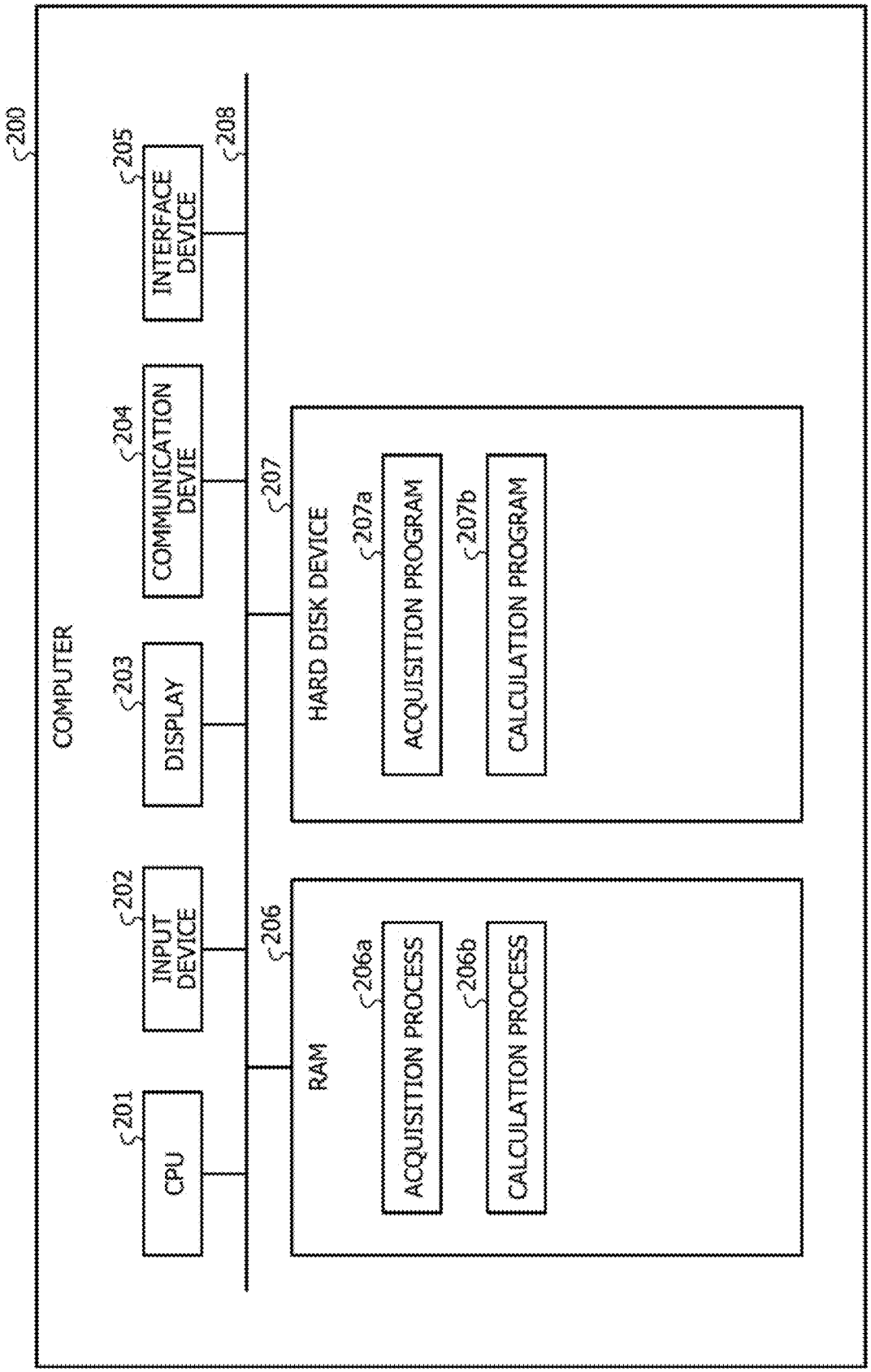
FIG. 8 is a diagram illustrating an example of a hardware configuration of a computer that implements the same functions as those of an EMI calculation apparatus.
Figure 9:
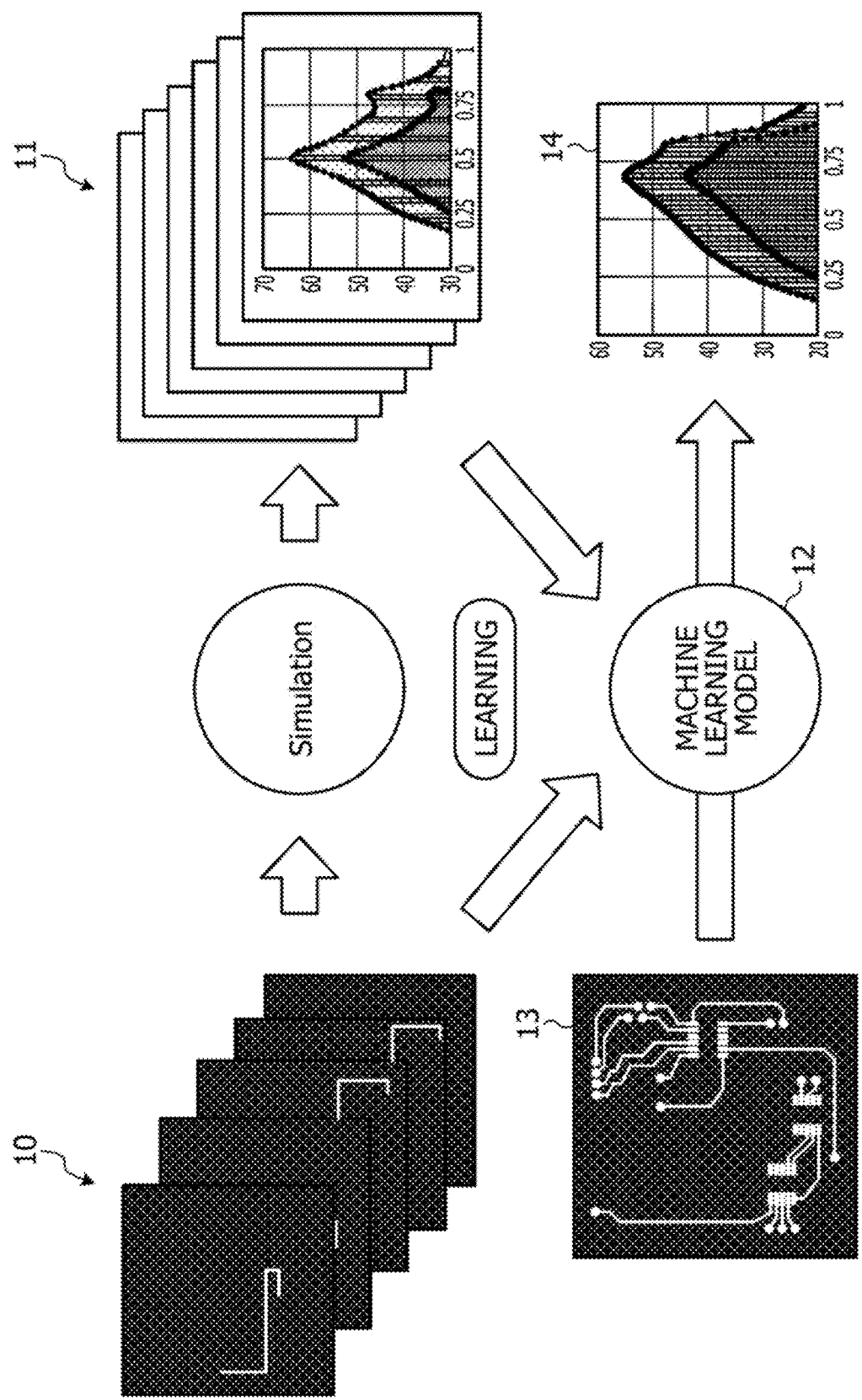
FIG. 9 is a diagram for describing Japanese Laid-open Patent Publication No. 2002-90403.

Next, an example of a hardware configuration of a computer that implements functions similar to those of the EMI calculation apparatus 100 described in the above embodiment will be described. FIG. 8 is a diagram illustrating an example of the hardware configuration of the computer that implements the same functions as those of the EMI calculation apparatus.

As illustrated in FIG. 8, a computer 200 includes a central processing unit (CPU) 201 that executes various kinds of arithmetic operation processing, an input device 202 that receives input of data from a user, and a display 203. The computer 200 includes a communication device 204 that receives data from an external apparatus, and an interface device 205 that is coupled to various devices. The computer 200 includes a random-access memory (RAM) 206 that temporarily stores various kinds of information, and a hard disk device 207. Each of the devices 201 to 207 is coupled to a bus 208.

The hard disk device 207 includes an acquisition program 207a and a calculation program 207b. The CPU 201 reads the acquisition program 207a and the calculation program 207b and loads the programs into the RAM 206.

The acquisition program 207a functions as an acquisition process 206a. The calculation program 207b functions as a calculation process 206b.

Processing of the acquisition process 206a corresponds to the processing of the acquisition unit 151. Processing of the calculation process 206b corresponds to the processing of the calculation unit 152.

Each of the programs 207a and 207b may not be stored in the hard disk device 207 from the beginning. For example, each of the programs are stored in a "portable physical medium" such as a flexible disk (FD), a compact disc read-only memory (CD-ROM), a Digital Versatile Disc (DVD) disc, a magneto-optical disk, and an IC card to be inserted into the computer 200. The computer 200 may read and execute each of the programs 207a and 207b.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an electro magnetic interference (EMI) calculation program that causes at least one computer to execute a process, the process comprising:

training a machine learning model on a relationship between a resonance frequency and an EMI value:

inputting circuit information of a first circuit to the machine learning model;

acquiring an EMI value at a certain frequency of the first circuit from the machine learning model;

selecting, based on an impedance characteristic of the first circuit and the EMI value at, the certain frequency, first EMI information from a plurality of pieces of EMT information in each of which an impedance characteristic of each of a plurality of circuits is associated with EMI values at a plurality of frequencies of each of the plurality of circuits; and acquiring an EMI value at another frequency different from the certain frequency of the first circuit based on the EMI value at the certain frequency and the first EMI information.

2. The non-transitory computer-readable storage medium according to claim 1, wherein the selecting includes selecting EMI information of a circuit corresponding to an impedance characteristic similar to the impedance characteristic of the first circuit among the plurality of pieces of EMI information as the first EMI information.

3. The non-transitory computer-readable storage medium according to claim 1, wherein the acquiring the EMI value at another frequency includes:

specifying a maximum EMI value among the EMI values at the plurality of frequencies included in the first EMI information; and acquiring the EMI value at another frequency by correcting a relationship between the plurality of frequencies of the first EMI information and the EMI value so that the maximum EMI value being close to the EMI value at the certain frequency.

4. The non-transitory computer-readable storage medium according to claim 1, wherein the acquiring the EMI value at the certain frequency includes:

inputting a resonance frequency of the first circuit to the machine learning model as the circuit information; and acquiring an EMI value at the resonance frequency.

5. An electro magnetic interference (EMI) calculation method for a computer to execute a process comprising:

training a machine learning model on a relationship between a resonance frequency and an EMI value;

inputting circuit information of a first circuit to a machine learning model;

acquiring an EMI value at a certain frequency of the first circuit from the machine learning model;

selecting, based on an impedance characteristic of the first circuit and the EMI value at the certain frequency, first EMI information from a plurality of pieces of EMI information in each of which an impedance characteristic of each of a plurality of circuits is associated with EMI values at a plurality of frequencies of each of the plurality of circuits; and acquiring an EMI value at another frequency different from the certain frequency of the first circuit based on the EMI value at the certain frequency and the first EMI information.

6. The EMI calculation method according to claim 5, wherein the selecting includes selecting EMI information of a circuit corresponding to an impedance characteristic similar to the impedance characteristic of the first circuit among the plurality of pieces of EMI information as the first EMI information.

7. The EMI calculation method according to claim 5, wherein the acquiring the EMI value at another frequency includes:

specifying a maximum EMI value among the EMI values at the plurality of frequencies included in the first EMI information; and acquiring the EMI value at another frequency by correcting a relationship between the plurality of frequencies of the first EMI information and the EMI value so that the maximum EMI value being close to the EMI value at the certain frequency.

8. The EMI calculation method according to claim 5, wherein the acquiring the EMI value at the certain frequency includes:

inputting a resonance frequency of the first circuit to the machine learning model as the circuit information; and acquiring an EMI value at the resonance frequency.

9. An electro magnetic interference (EMI) calculation apparatus comprising:

one or more memories; and one or more processors coupled to the one or more memories and the one or more processors configured to:

train a machine learning model on a relationship between a resonance frequency and an EMI value;

input circuit information of a first circuit to the machine learning model, acquire an EMI value at a certain frequency of the first circuit from the machine learning model, select, based on an impedance characteristic of the first circuit and the EMI value at the certain frequency, first EMI information from a plurality of pieces of EMI information in each of which an impedance characteristic of each of a plurality of circuits is associated with EMI values at a plurality of frequencies of each of the plurality of circuits, and acquire an EMI value at another frequency different from the certain frequency of the first circuit based on the EMI value at the certain frequency and the first EMI information.

10. The EMI calculation apparatus according to claim 9, wherein the one or more processors are further configured to select EMI information of a circuit corresponding to an impedance characteristic similar to the impedance characteristic of the first circuit among the plurality of pieces of EMI information as the first EMI information.

11. The EMI calculation apparatus according to claim 9, wherein the one or more processors are further configured to:

specify a maximum EMI value among the EMI values at the plurality of frequencies included in the first EMI information, and acquire the EMI value at another frequency by correcting a relationship between the plurality of frequencies of the first EMI information and the EMI value so that the maximum EMI value being close to the EMI value at the certain frequency.

12. The EMI calculation apparatus according to claim 9, wherein the one or more processors are further configured to:

input a resonance frequency of the first circuit to the machine learning model as the circuit information, and acquire an EMI value at the resonance frequency.

* * * * *